United States Patent
Yabuta et al.

(10) Patent No.: US 10,077,928 B2
(45) Date of Patent: Sep. 18, 2018

(54) AIR-CONDITIONING SYSTEM AND CONTROL METHOD FOR AIR-CONDITIONING SYSTEM

(75) Inventors: Atsuhiro Yabuta, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 729 days.

(21) Appl. No.: 14/382,774

(22) PCT Filed: Jun. 21, 2012

(86) PCT No.: PCT/JP2012/004013
§ 371 (c)(1),
(2), (4) Date: Sep. 4, 2014

(87) PCT Pub. No.: WO2013/190596
PCT Pub. Date: Dec. 27, 2013

(65) Prior Publication Data
US 2015/0013365 A1    Jan. 15, 2015

(51) Int. Cl.
F25D 17/06    (2006.01)
F25B 49/00    (2006.01)
G05D 23/19    (2006.01)
F24F 11/30    (2018.01)
F24F 110/10   (2018.01)
F24F 11/63    (2018.01)

(52) U.S. Cl.
CPC .............. *F25B 49/00* (2013.01); *F24F 11/30* (2018.01); *G05D 23/1931* (2013.01); *F24F 11/63* (2018.01); *F24F 2110/10* (2018.01)

(58) Field of Classification Search
CPC .. F25B 49/00; G05D 23/1931; F24F 11/0012; F24F 2011/0061
See application file for complete search history.

(56) References Cited

U.S. PATENT DOCUMENTS

| | | | |
|---|---|---|---|
| 2006/0086103 A1* | 4/2006 | Lee | F24F 11/006 62/126 |
| 2010/0070087 A1* | 3/2010 | Shima | F24F 11/0086 700/277 |

FOREIGN PATENT DOCUMENTS

| | | | |
|---|---|---|---|
| JP | S63187040 A | * | 8/1988 |
| JP | H10197036 A | * | 7/1998 |
| JP | H11159845 A | * | 6/1999 |
| JP | H11337163 A | * | 12/1999 |
| JP | 2008-075993 A | | 4/2008 |

(Continued)

OTHER PUBLICATIONS

Nishino et al., Air Conditioning Information Supply Device, Jan. 19, 2012, JP2012013311A, Whole Document.*

(Continued)

*Primary Examiner* — Larry Furdge
(74) *Attorney, Agent, or Firm* — Posz Law Group, PLC (57) ABSTRACT

A setting unit acquires the temperature of an air-conditioned space, calculates the difference between the temperature of the air-conditioned space and a suction temperature as a correction amount ΔT, and transmits information of the correction amount ΔT to an air-conditioning apparatus. A controller of the air-conditioning apparatus controls the operation of the air-conditioning apparatus so that a control temperature obtained by adding the correction amount ΔT to the suction temperature becomes equal to a set temperature.

14 Claims, 4 Drawing Sheets

(56) References Cited

FOREIGN PATENT DOCUMENTS

| JP | 4478082 B2 | 3/2010 |
|---|---|---|
| JP | 2011-058720 A | 3/2011 |
| JP | 2011-153764 A | 8/2011 |
| JP | 2012-013311 A | 1/2012 |
| JP | 2012013311 A * | 1/2012 |

OTHER PUBLICATIONS

Kiguchi et al., Air Conditioning System, Jul. 31, 1998, JPH10197036A, Whole Document.*
Kataoka, Connector Device for Auxiliary Hot Water Feeding Machine, Dec. 10, 1999, JPH11337163A, Whole Document.*
Ehira et al., Control Device of Air Conditioner, Aug. 2, 1988, JPS63187040A, Whole Document.*
Tachimori et al., Outer Air Temperature Indicator/Controller for Air Conditioner, Jun. 15, 1999, JPH11159845A, Whole Document.*
Office Action dated Aug. 25, 2015 issued in corresponding JP patent application No. 2014-520811 (and English translation).
International Search Report of the International Searching Authority dated Sep. 25, 2012 for the corresponding international application No. PCT/JP2012/004013 (and English translation).

* cited by examiner

AIR-CONDITIONING SYSTEM AND CONTROL METHOD FOR AIR-CONDITIONING SYSTEM

CROSS REFERENCE TO RELATED APPLICATIONS

This application is a U.S. national stage application of PCT/JP2012/004013 filed on Jun. 21, 2012, the contents of which are incorporated herein by reference.

TECHNICAL FIELD

The present invention relates to an air-conditioning system including an air-conditioning apparatus that air-conditions an indoor space, and a control method for the air-conditioning system.

BACKGROUND

A conventional air-conditioning apparatus sets a desired temperature with a remote controller or the like, and controls the operation of, for example, the compressor of the air-conditioning apparatus on the basis of the set temperature. In this control, it is a common practice to use the suction temperature at the inlet of the heat exchanger of the indoor unit as a representative value of the indoor temperature, and control the air-conditioning apparatus on the basis of the difference between the suction temperature and the set temperature.

As a control method for an air-conditioning apparatus which reduces, for example, the difference between high and low temperatures of a room, a method has been proposed in which the indoor unit is provided with a radiation sensor for detecting the temperature of the floor, and the air-conditioning apparatus is controlled by correcting the temperature detected by a suction temperature sensor of the indoor unit (see, for example, Patent Literature 1).

PATENT LITERATURE

Patent Literature 1: Japanese Patent No. 4478082 (paragraph [0021], FIG. 6)

A conventional air-conditioning apparatus controls an air-conditioned space to have a temperature close to a set temperature by utilizing a sensor function incorporated in the indoor unit. However, depending on, for example, the position at which the indoor unit is arranged in an indoor space, or the position at which a structure is arranged within the air-conditioned space, the set temperature and the temperature of the air-conditioned space may deviate from each other.

SUMMARY

The present invention has been made to address the above-mentioned problem, and provides an air-conditioning system and a control method for an air-conditioning system which make it possible to reduce the difference between a set temperature and the temperature of an air-conditioned space.

An air-conditioning system according to the present invention includes an air-conditioning apparatus that includes an indoor unit installed in an indoor space and is configured to air-condition an air-conditioned space in the indoor space, and a setting unit configured to communicate with the air-conditioning apparatus. The air-conditioning apparatus includes a suction temperature sensor configured to detect the temperature of air drawn by suction into the indoor unit, and a controller configured to control the operation of the air-conditioning apparatus on the basis of a set temperature and the temperature detected by the suction temperature sensor. The setting unit is configured to acquire the temperature of the air-conditioned space, and calculate the difference between the temperature of the air-conditioned space and the temperature detected by the suction temperature sensor as a correction amount and transmit information of the correction amount to the air-conditioning apparatus. The controller of the air-conditioning apparatus controls the operation of the air-conditioning apparatus so that a control temperature obtained by adding the correction amount received from the setting unit to the temperature detected by the suction temperature sensor becomes equal to the set temperature.

According to the present invention, the setting unit acquires the temperature of the air-conditioned space, calculates a correction amount, and transmits information of this correction amount to the air-conditioning apparatus. Then, the controller of the air-conditioning apparatus controls the operation of the air-conditioning apparatus so that a control temperature, which is obtained by adding the correction amount received from the setting unit to the temperature detected by the suction temperature sensor, becomes equal to a set temperature. As a result, the difference between the set temperature and the temperature of the air-conditioned space can be reduced.

DETAILED DESCRIPTION

Embodiment 1

Figure 1:
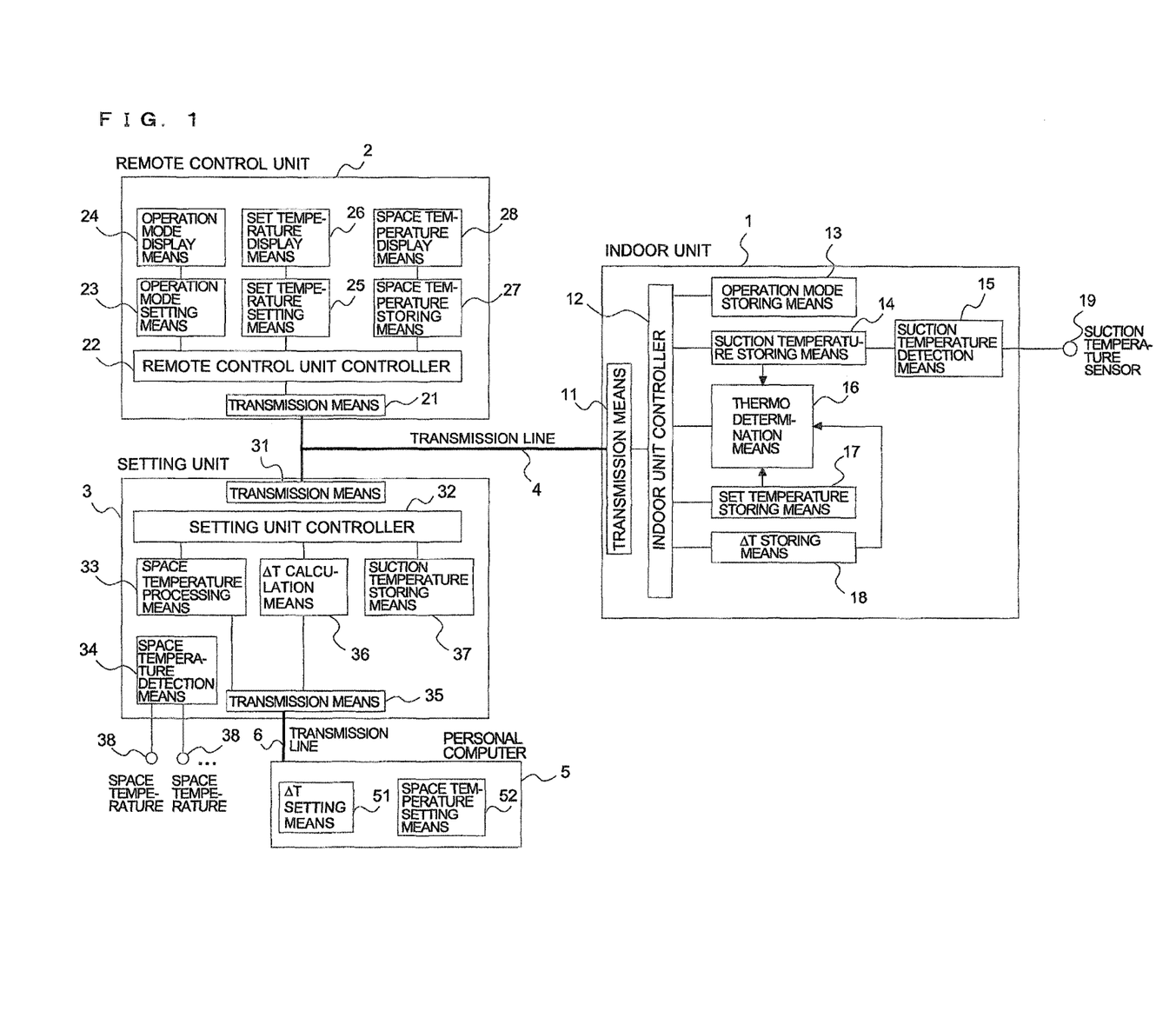
FIG. 1 is a block diagram illustrating the configuration of an air-conditioning system according to Embodiment 1 of the present invention.

FIG. 1 is a block diagram illustrating the configuration of an air-conditioning system according to Embodiment 1 of the present invention.

As illustrated in FIG. 1, the air-conditioning system includes an indoor unit 1 that constitutes an air-conditioning apparatus, a remote control unit 2, a setting unit 3, and a personal computer 5.

Information is mutually transmitted by the indoor unit 1, the remote control unit 2, and the setting unit 3 via a transmission line 4. Information is mutually transmitted between the setting unit 3 and the personal computer 5 via a transmission line 6.

The indoor unit 1 is connected with an outdoor unit by a refrigerant pipe. The indoor unit 1 air-conditions an air-conditioned space in an indoor space by changing the pressure of a refrigerant flowing in the refrigerant pipe to remove heat from or reject heat to the refrigerant.

The indoor unit 1 includes transmission means 11, an indoor unit controller 12, operation mode storing means 13, suction temperature storing means 14, suction temperature detection means 15, thermo determination means 16, set temperature storing means 17, ΔT storing means 18, and a suction temperature sensor 19.

The transmission means 11 transmits information between the remote control unit 2 and the setting unit 3 via the transmission line 4.

The indoor unit controller 12 controls the operation of various devices constituting the indoor unit 1 in a centralized manner.

The operation mode storing means 13 stores an operation mode set via the remote control unit 2.

The suction temperature sensor 19 is implemented using, for example, a thermistor. The suction temperature sensor 19 detects the temperature of air that has been drawn by suction into the indoor unit 1 and has not yet undergone air-conditioning (to be referred to as a suction temperature hereinafter).

The suction temperature detection means 15 inputs temperature information detected by the suction temperature sensor 19 to the suction temperature storing means 14.

The set temperature storing means 17 stores a set temperature set from the remote control unit 2.

The ΔT storing means 18 stores information of a correction amount ΔT transmitted from the setting unit 3.

The thermo determination means 16 determines thermo-OFF that causes an air-conditioning operation to stop, or thermo-ON that makes an air-conditioning operation active, on the basis of the suction temperature, the correction amount ΔT, and the set temperature.

The indoor unit controller 12 and the thermo determination means 16 each correspond to a "controller" according to the present invention.

The remote control unit 2 is arranged on, for example, a wall in the air-conditioned space in the indoor space, or a user's hand.

The remote control unit 2 includes transmission means 21, a remote control unit controller 22, operation mode setting means 23, operation mode display means 24, set temperature setting means 25, set temperature display means 26, space temperature storing means 27, and space temperature display means 28.

The transmission means 21 transfers information between the indoor unit 1 and the setting unit 3 via the transmission line 4.

The operation mode setting means 23 sets the operation mode (such as heating operation or cooling operation) of the indoor unit 1 in accordance with an operational input.

The operation mode display means 24 displays the set operation mode.

The set temperature setting means 25 sets the set temperature of the indoor unit 1 in accordance with an operational input.

The set temperature display means 26 displays information of the set temperature that has been set.

The space temperature storing means 27 stores information of the temperature of the air-conditioned space transmitted from the setting unit 3.

The space temperature display means 28 displays the information of the temperature of the air-conditioned space stored in the space temperature storing means 27.

The setting unit 3 acquires the temperature of the air-conditioned space, and calculates, as the correction amount ΔT, the difference between the temperature of the air-conditioned space and the temperature detected by the suction temperature sensor 19. The setting unit 3 then transmits information of the correction amount to the indoor unit 1 of the air-conditioning apparatus.

The setting unit 3 includes transmission means 31, a setting unit controller 32, space temperature processing means 33, space temperature detection means 34, transmission means 35, ΔT calculation means 36, suction temperature storing means 37, and space temperature sensors 38.

The transmission means 31 transfers information between the indoor unit 1 and the remote control unit 2 via the transmission line 4.

The transmission means 35 exchanges information with the personal computer 5 via the transmission line 6.

The setting unit controller 32 controls the operation of various units constituting the setting unit 3 in a centralized manner.

The space temperature sensor 38 is implemented using, for example, a thermistor. The space temperature sensor 38 detects the temperature of the air-conditioned space (to be also referred to as a space temperature hereinafter) to be air-conditioned by the indoor unit 1. While FIG. 1 illustrates a case where two space temperature sensors 38 are provided, the present invention is not limited to this. Either of a single space temperature sensor 38 and a plurality of space temperature sensors 38 may be provided.

The space temperature detection means 34 inputs information of the temperature detected by the space temperature sensors 38 to the space temperature processing means 33.

The space temperature processing means 33 executes an arithmetic process such as computation of the average of temperatures detected by the space temperature sensors 38 when, for example, a plurality of space temperature sensors 38 are provided. When a single space temperature sensor 38 is provided, the space temperature processing means 33 may be omitted and the space temperature may be read directly into the setting unit controller 32.

The suction temperature storing means 37 stores information of the suction temperature transmitted from the indoor unit 1.

The ΔT calculation means 36 calculates the correction amount ΔT on the basis of the space temperature and the suction temperature.

The personal computer 5 includes ΔT setting means 51 and space temperature setting means 52.

The ΔT setting means 51 sets the correction amount ΔT in accordance with an operational input.

The space temperature setting means 52 sets the space temperature in accordance with an operational input.

While the setting unit 3 is described as an independent component in Embodiment 1, the function of the setting unit 3 may be incorporated in the remote control unit 2 or the indoor unit 1.

A configuration in which the function of the setting unit 3 is incorporated in the remote control unit 2 will be described below.

Next, operation will be described.

Figure 2:
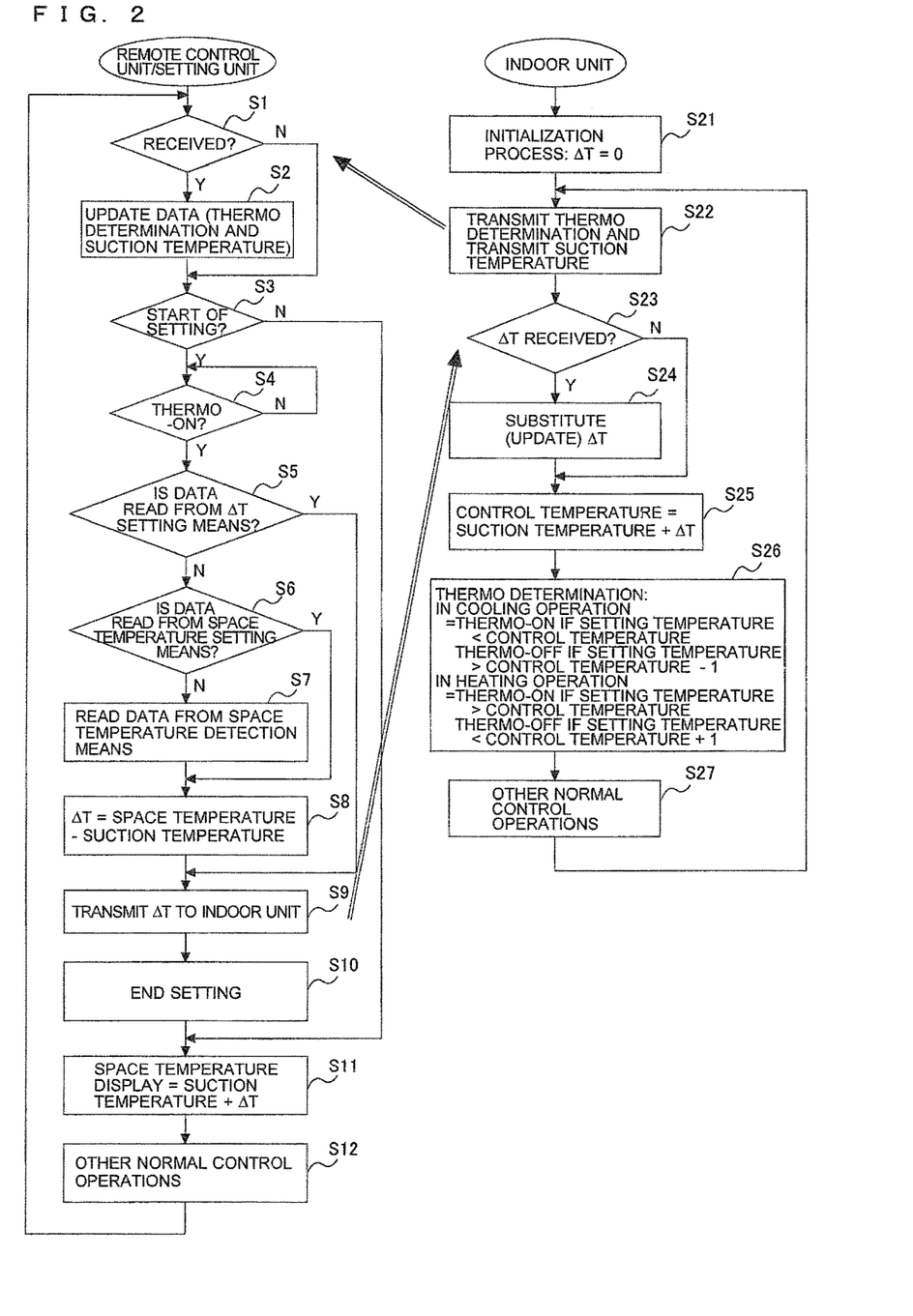
FIG. 2 is a flowchart illustrating the operation of a setting unit and an indoor unit according to Embodiment 1 of the present invention.

FIG. 2 is a flowchart illustrating the operation of the setting unit and the indoor unit according to Embodiment 1 of the present invention.

The following description will be given with reference to each of steps illustrated in FIG. 2.

(Indoor Unit 1)

First, the operation of the indoor unit 1 will be described.

(S21)

The indoor unit controller 12 performs an initialization process. The indoor unit controller 12 sets the correction amount ΔT stored in the ΔT storing means 18 to an initial value (for example, zero), and proceeds to step S22.

Although steps S22 to S27 to be described below are a looped flow, they are actually executed periodically.

(S22)

The indoor unit controller 12 transmits a thermo determination value determined by the thermo determination means 16, and information of the suction temperature to the remote control unit 2 and the setting unit 3 via the transmission means 11, and proceeds to step S23.

(S23)

The indoor unit controller 12 determines whether information of the correction amount ΔT has been received from the setting unit 3. The indoor unit controller 12 proceeds to step S24 if the information has been received, and proceeds to step S25 if the information has not been received.

(S24)

The indoor unit controller 12 updates information of the correction amount ΔT stored in the ΔT storing means 18 to the received correction amount ΔT, and proceeds to step S25.

(S25)

The thermo determination means 16 adds the correction amount ΔT received from the setting unit 3 to the suction temperature detected by the suction temperature sensor 19, sets the resulting value as a control temperature used for thermo determination, and proceeds to step S26.

(S26)

The thermo determination means 16 executes thermo determination under the following conditions, on the basis of the operation mode stored in the operation mode storing means 13, the set temperature stored in the set temperature storing means 17, and the control temperature calculated in step S25, and then proceeds to step S27.

The thermo determination means 16 switches the operational state to thermo-ON if the set temperature is lower than the control temperature when thermo-OFF is set in cooling operation.

The thermo determination means 16 switches the operational state to thermo-OFF if the set temperature is higher than the control temperature minus 1 degree C. when thermo-ON is set in cooling operation.

The thermo determination means 16 switches the operational state to thermo-ON if the set temperature is higher than the control temperature when thermo-OFF is set in heating operation.

The thermo determination means 16 switches the operational state to thermo-OFF if the set temperature is lower than the control temperature plus 1 degree C. when thermo-ON is set in heating operation.

(S27)

The indoor unit controller 12 executes other normal control operations (not described in detail) as the indoor unit 1, and returns to step S22.

In this way, the correction amount ΔT calculated in the setting unit 3 is transmitted to the indoor unit 1 and used to correct the control temperature. As a result, as opposed to conventional thermo determination, control can be performed which reduces the difference between the suction temperature and the space temperature and makes the set temperature closer to the space temperature.

Further, the indoor unit 1 can be controlled in the same manner for any type of external device from which the correction amount ΔT is received. Therefore, by inputting the correction amount ΔT to the indoor unit 1 from the outside of the air-conditioning apparatus, the indoor unit 1 can be easily caused to execute desired thermo determination.

(Setting Unit 3)

Next, the operation of the setting unit 3 incorporated in the remote control unit 2 will be described.

(S1)

The setting unit controller 32 determines whether a thermo determination value and data of the suction temperature have been received from the indoor unit 1 to be controlled. The setting unit controller 32 proceeds to step S2 if these pieces of information have been received, and proceeds to step S3 if these pieces of information have not been received.

(S2)

The setting unit controller 32 updates the thermo determination value and the data of the suction temperature that have been received, and proceeds to step S3.

(S3)

The setting unit controller 32 determines whether to start setting of the correction amount ΔT. The setting unit controller 32 proceeds to step S4 if the setting is to be started, and proceeds to step S11 if the setting is not to be started.

As the condition for starting setting in step S3, the setting unit controller 32 determines to start the setting when, for example, new data is set for the space temperature setting means 52. Alternatively, for example, the setting unit controller 32 determines to start the setting periodically every time a predetermined period of time elapses.

(S4)

The setting unit controller 32 determines whether the operational state of the indoor unit 1 is thermo-ON. The setting unit controller 32 proceeds to step S5 if the operational state is thermo-ON, and repeats step S4 if the operational state is not thermo-ON.

Through this determination, setting of the correction amount ΔT is executed during thermo-ON. The reason for executing this setting during thermo-ON is as follows. That is, by setting the correction amount ΔT under a situation when the air-conditioning apparatus (indoor unit 1) is exerting its capacity and circulating indoor air at a predetermined flow rate, it is possible to calculate a correction amount ΔT closer to that which provides a sense of body.

(S5)

The setting unit controller 32 determines whether data of the correction amount ΔT has been acquired from the ΔT setting means 51 of the personal computer 5. The setting unit controller 32 proceeds to step S6 if the data has not been read, and proceeds to step S9 if the data has been read.

When the correction amount ΔT is set in the personal computer 5, the setting unit controller 32 causes the transmission means 35 to read via the transmission line 6 information set in the ΔT setting means 51 of the personal computer 5, and directly transfers it into the ΔT calculation means 36.

(S6)

The setting unit controller 32 determines whether data of the space temperature has been acquired from the space temperature setting means 52 of the personal computer 5. The setting unit controller 32 proceeds to step S7 if the data has not been read, and proceeds to step S8 if the data has been read.

When the space temperature is set in the personal computer 5, the setting unit controller 32 causes the transmission means 35 to read via the transmission line 6 information set in the space temperature setting means 52 of the personal computer 5, and directly transfers it into the space temperature processing means 33.

(S7)

The setting unit controller 32 acquires data of the space temperature by the space temperature detection means 34, and proceeds to step S8.

At this time, the average of the space temperatures obtained by the plurality of space temperature sensors 38, which is obtained by an arithmetic process in the space temperature processing means 33, may be acquired, or the largest value or smallest value among the values of the space temperatures obtained by the plurality of space temperature sensors 38 may be acquired.

(S8)

The $\Delta T$ calculation means 36 calculates the difference between the space temperature and the suction temperature as the correction amount $\Delta T$, and proceeds to step S9.

(S9)

The setting unit controller 32 transmits information of the correction amount $\Delta T$ to the indoor unit 1 via the transmission line 6, and proceeds to step S10.

(S10)

The setting unit controller 32 ends the current setting process, and proceeds to step S11.

(S11)

The remote control unit controller 22 of the remote control unit 2 causes the space temperature storing means 27 to store, as the space temperature, a temperature obtained by adding the correction amount $\Delta T$ to the suction temperature received by the indoor unit 1, and proceeds to step S12. As a result, temperature information indicative of the sum of the suction temperature and the correction amount $\Delta T$ is displayed on the space temperature display means 28.

(S12)

The remote control unit controller 22 of the remote control unit 2 executes other normal control operations (not described in detail) as the remote control unit 2, and returns to step S1.

As described above, in Embodiment 1, the setting unit 3 acquires the temperature of the air-conditioned space, calculates the difference between the acquired temperature of the air-conditioned space and the suction temperature as the correction amount $\Delta T$, and transmits information of the correction amount $\Delta T$ to the air-conditioning apparatus. Then, the indoor unit 1 controls operation by performing thermo determination in such a way that a control temperature obtained by adding the correction amount $\Delta T$ received from the setting unit 3 to the suction temperature becomes equal to a set temperature. Consequently, the difference between the set temperature and the temperature of the air-conditioned space can be reduced. Therefore, the comfort of the air-conditioned environment can be improved.

Further, the setting unit 3 that acquires the space temperature other than the suction temperature detected by the indoor unit 1, and transmits the correction amount $\Delta T$ to the indoor unit 1 is provided as a separate component. This provides the effect of resolving the deviation between the space temperature and the set temperature by simply reflecting the correction amount $\Delta T$ on the control of the indoor unit 1.

In Embodiment 1, the correction amount $\Delta T$ is given from the setting unit 3. Consequently, by using a transmission signal transmitted via the transmission line 4, information can be given from the outside of the air-conditioning apparatus. As a result, a load of air-conditioning facility design which depends on the building, and a load of designing the air-conditioning apparatus itself can be shared among designers. Therefore, it is easy to add features and effects for each individual pieces of property in the air-conditioning facility design.

In Embodiment 1, information of the correction amount $\Delta T$ given from the setting unit 3 is stored in the $\Delta T$ storing means 18, and the control temperature is calculated by using this stored information. Accordingly, the correction amount $\Delta T$ has an initial value of zero, and is updated through communication via the transmission means. At this time, for example, even if the communication between the indoor unit 1 and the setting unit 3 stops abruptly, or a fault occurs in the setting unit 3, the correction amount $\Delta T$ can be acquired from the past data.

In Embodiment 1, temperature information indicative of the sum of the suction temperature and the correction amount $\Delta T$ is displayed on the space temperature display means 28 of the remote control unit 2.

Conventionally, the deviation between the space temperature (suction temperature) displayed on the remote control unit 2 and the actual space temperature, including a sensor error, often becomes a problem. In Embodiment 1, however, by adding or subtracting the correction amount $\Delta T$ to or from the suction temperature that has been actually measured, the accuracy of the displayed space temperature can be improved.

Embodiment 1 may be adapted to both the case where the correction amount $\Delta T$ is set once and the case where it is set a plurality of times, and control can be continued even if reception of the correction amount $\Delta T$ stops abruptly.

While Embodiment 1 is directed to the case where a single indoor unit 1 is provided, a plurality of indoor units 1 may be provided. It is needless to mention that when a plurality of indoor units 1 are provided, by using a plurality of space temperature sensors 38 and setting the correction amount $\Delta T$ separately for each of the indoor units 1, the deviation between the space temperature and the set temperature in each of a plurality of indoor spaces can be canceled by means of a single setting unit 3.

Further, the average of the suction temperature sensors 19 of the plurality of indoor units 1 may be calculated, and the correction amount $\Delta T$ may be calculated by using this average as the suction temperature.

When the correction amount $\Delta T$ or the space temperature is directly set by the personal computer 5, an application that allows an algorithm to be freely set within the personal computer 5 may be provided. By setting the correction amount $\Delta T$ or the space temperature within such an application, it is possible to freely set thermo-ON/OFF of the indoor unit 1.

Embodiment 1 mentioned above is directed to the following case. That is, in step S5, data of the correction amount $\Delta T$ is read from the $\Delta T$ setting means 51. If this reading is not performed, in step S6, data of the space temperature from the space temperature setting means 52 is read. If this reading is not performed, data of the space temperature is acquired by the space temperature detection means 34. However, the present invention is not limited to this. It is also possible to execute only at least one of steps S5, S6, and S7.

Embodiment 2

Embodiment 2 describes an exemplary mode in which the correction amount $\Delta T$ is updated as appropriate so that correction of the space temperature can be set more finely.

Figure 3:
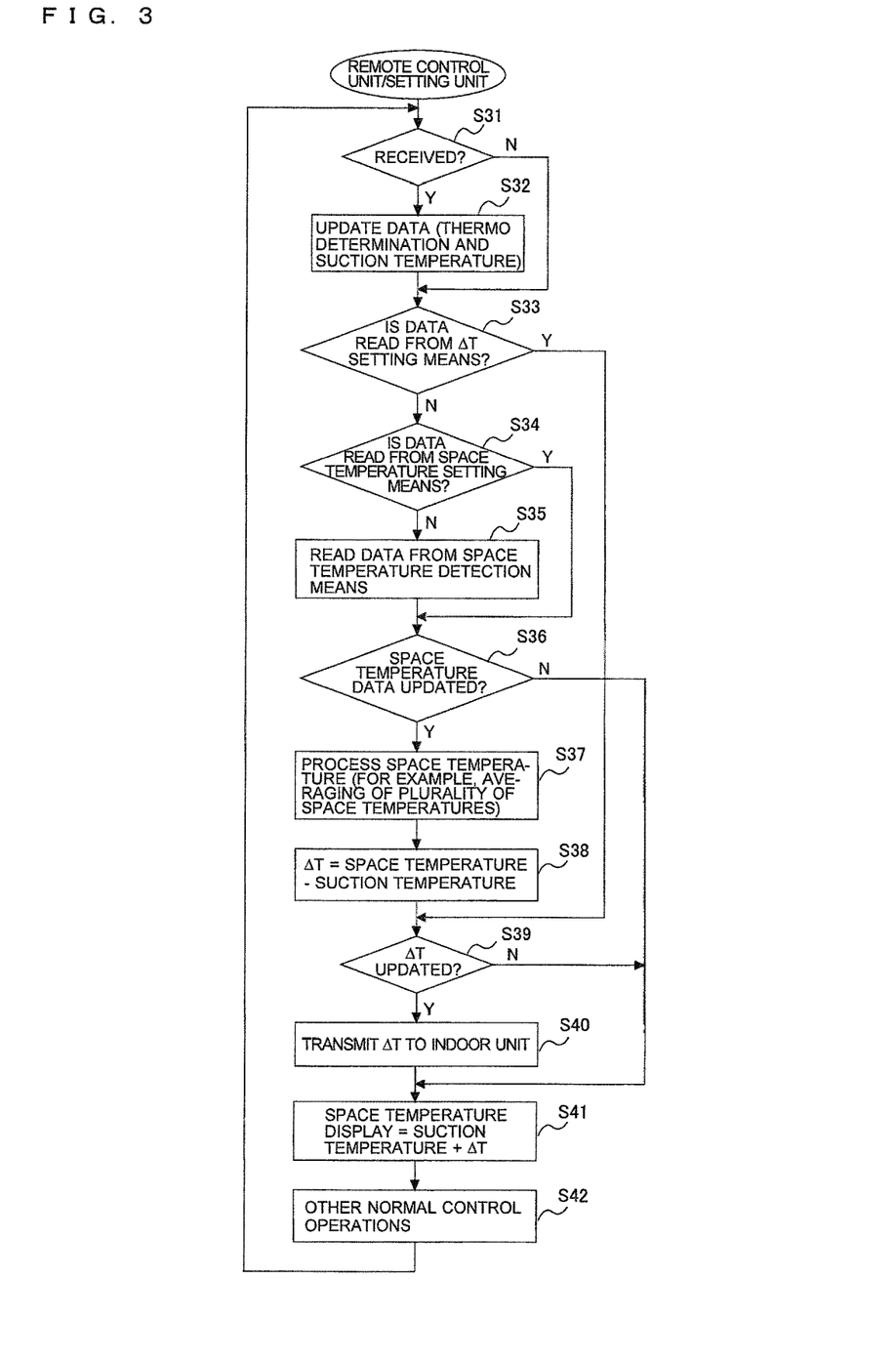
FIG. 3 is a flowchart illustrating the operation of the setting unit according to Embodiment 2 of the present invention.

FIG. 3 is a flowchart illustrating the operation of the setting unit according to Embodiment 2 of the present invention.

The operation of the setting unit 3 incorporated in the remote control unit 2 will be described hereinafter with reference to each of steps illustrated in FIG. 3.

Since the operation of the indoor unit 1 is the same as in Embodiment 1, a description thereof will be omitted.

(S31)

The setting unit controller 32 determines whether a thermo determination value and data of the suction temperature have been received from the indoor unit 1 to be controlled. The setting unit controller 32 proceeds to step S32 if these pieces of information have been received, and proceeds to step S33 if these pieces of information have not been received.

(S32)

The setting unit controller 32 updates the thermo determination value and the data of the suction temperature that have been received, and proceeds to step S33.

(S33)

The setting unit controller 32 determines whether data of the correction amount ΔT has been acquired from the ΔT setting means 51 of the personal computer 5. The setting unit controller 32 proceeds to step S34 if the data has not been read, and proceeds to step S39 if the data has been read.

When the correction amount ΔT is set in the personal computer 5, the setting unit controller 32 causes the transmission means 35 to read via the transmission line 6 information set in the ΔT setting means 51 of the personal computer 5, and directly transfers it into the ΔT calculation means 36.

(S34)

The setting unit controller 32 determines whether data of the space temperature has been acquired from the space temperature setting means 52 of the personal computer 5. The setting unit controller 32 proceeds to step S35 if the data has not been read, and proceeds to step S36 if the data has been read.

When the space temperature is set in the personal computer 5, the setting unit controller 32 causes the transmission means 35 to read via the transmission line 6 information set in the space temperature setting means 52 of the personal computer 5, and directly transfers it into the space temperature processing means 33.

(S35)

The setting unit controller 32 acquires data of the space temperature by the space temperature detection means 34, and proceeds to step S36.

(S36)

The setting unit controller 32 determines whether data of the space temperature has been updated. The setting unit controller 32 proceeds to step S37 if the data has been updated, and proceeds to step S41 if the data has not been updated.

In this regard, data of the space temperature is updated when, for example, the temperature acquired by the space temperature detection means 34 has changed by a predetermined value or more (for example, ±0.5 degrees C. or more) or the settings on the space temperature setting means 52 have been changed.

(S37)

The space temperature processing means 33 performs an arithmetic process on space temperature such as averaging of a plurality of space temperatures on the basis of the read space temperature data, and proceeds to step S38.

This arithmetic process is not limited to averaging but may be acquisition of the largest or smallest value among the values of the space temperatures obtained by the plurality of space temperature sensors 38.

(S38)

The ΔT calculation means 36 calculates the difference between the space temperature and the suction temperature as the correction amount ΔT, and proceeds to step S39.

(S39)

The setting unit controller 32 determines whether the correction amount ΔT has been changed. The setting unit controller 32 proceeds to step S40 if the correction amount ΔT has been changed, and proceeds to step S41 if the correction amount ΔT has not been changed.

(S40)

The setting unit controller 32 transmits information of the correction amount ΔT to the indoor unit 1 via the transmission line 6, and proceeds to step S41.

(S41)

The remote control unit controller 22 of the remote control unit 2 causes the space temperature storing means 27 to store, as the space temperature, a temperature obtained by adding the correction amount ΔT to the suction temperature received by the indoor unit 1, and proceeds to step S42. As a result, temperature information indicative of the sum of the suction temperature and the correction amount ΔT is displayed on the space temperature display means 28.

(S42)

The remote control unit controller 22 of the remote control unit 2 executes other normal control operations (not described in detail) as the remote control unit 2, and returns to step S31.

As described above, in Embodiment 2, every time data of the space temperature is updated, the correction amount ΔT is calculated, and information of this correction amount ΔT is transmitted to the indoor unit 1. Because space temperature data is read continuously, and the correction amount ΔT is also updated as appropriate, the deviation between the set temperature and the actual space temperature at a desired position can be reduced.

Further, the same effect as that in Embodiment 1 can be obtained.

Embodiment 3

Embodiment 3 describes an exemplary mode in which the thermo determination in the indoor unit 1 is brought closer to the actual space temperature control, when updating of the correction amount ΔT stops abruptly.

Figure 4:
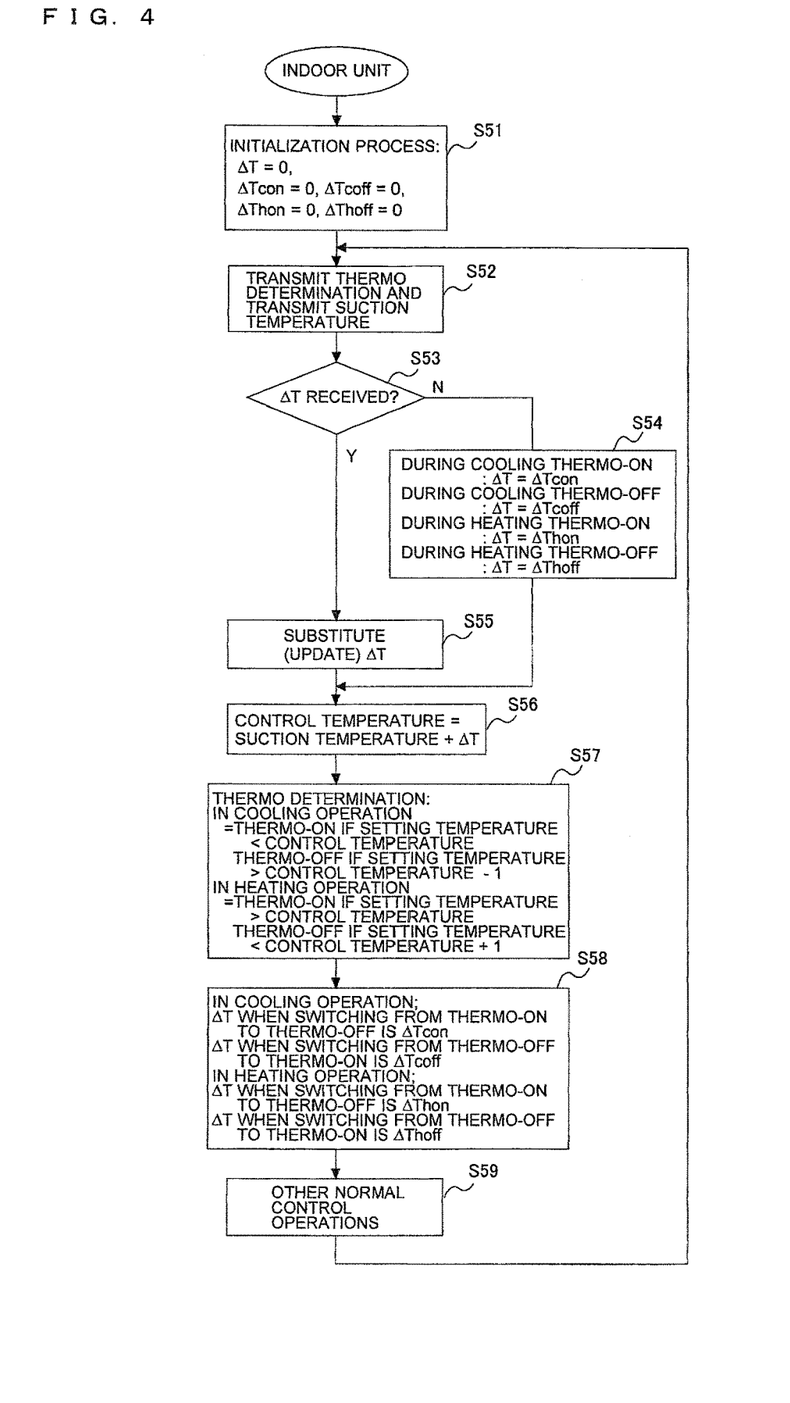
FIG. 4 is a flowchart illustrating the operation of the indoor unit according to Embodiment 3 of the present invention.

FIG. 4 is a flowchart illustrating the operation of the indoor unit according to Embodiment 3 of the present invention.

The operation of the indoor unit 1 will be described hereinafter with reference to each of steps illustrated in FIG. 4.

Since the operations of the remote control unit 2 and setting unit 3 are the same as in Embodiment 1 or 2, a description thereof will be omitted.

(S51)

The indoor unit controller 12 executes an initialization process. The indoor unit controller 12 sets the correction amount ΔT, as well as ΔTcon, ΔTcoff, ΔThon, and ΔThoff stored in the ΔT storing means 18 to their initial value (for example, zero), and proceeds to step S52.

In this regard, ΔTcon is a variable that stores the correction amount ΔT obtained when the operational state is switched from thermo-ON to thermo-OFF during cooling operation.

ΔTcoff is a variable that stores the correction amount ΔT obtained when the operational state is switched from thermo-OFF to thermo-ON during cooling operation.

ΔThon is a variable that stores the correction amount ΔT obtained when the operational state is switched from thermo-ON to thermo-OFF during heating operation.

ΔThoff is a variable that stores the correction amount ΔT obtained when the operational state is switched from thermo-OFF to thermo-ON during heating operation.

Although steps S52 to S59 to be described below are a looped flow, they are actually executed periodically.

(S52)

The indoor unit controller 12 transmits a thermo determination value determined by the thermo determination means 16, and information of the suction temperature to the remote control unit 2 and the setting unit 3 via the transmission means 11, and proceeds to step S53.

(S53)

The indoor unit controller 12 determines whether information of the correction amount ΔT has been received from the setting unit 3. The indoor unit controller 12 proceeds to step S55 if the information has been received, and proceeds to step S54 if the information has not been received.

(S54)

When thermo-ON is set in cooling operation, the indoor unit controller 12 substitutes ΔTcon for the correction amount ΔT to be stored in the ΔT storing means 18, and proceeds to step S56.

When thermo-OFF is set in cooling operation, the indoor unit controller 12 substitutes ΔTcoff for the correction amount ΔT to be stored in the ΔT storing means 18, and proceeds to step S56.

When thermo-ON is set in heating operation, the indoor unit controller 12 substitutes ΔThon for the correction amount ΔT to be stored in the ΔT storing means 18, and proceeds to step S56.

When thermo-OFF is set in heating operation, the indoor unit controller 12 substitutes ΔThoff for the correction amount ΔT to be stored in the ΔT storing means 18, and proceeds to step S56.

(S55)

The indoor unit controller 12 updates information of the correction amount ΔT stored in the ΔT storing means 18 to the received correction amount ΔT, and proceeds to step S56.

(S56)

The thermo determination means 16 adds the correction amount ΔT received from the setting unit 3 to the suction temperature detected by the suction temperature sensor 19, sets the resulting value as a control temperature used for thermo determination, and proceeds to step S57.

(S57)

The thermo determination means 16 executes thermo determination under the following conditions, on the basis of the operation mode stored in the operation mode storing means 13, the set temperature stored in the set temperature storing means 17, and the control temperature calculated in step S56, and then proceeds to step S58.

The thermo determination means 16 switches the operational state to thermo-ON if the set temperature is lower than the control temperature when thermo-OFF is set in cooling operation.

The thermo determination means 16 switches the operational state to thermo-OFF if the set temperature is higher than the control temperature minus 1 degree C. when thermo-ON is set in cooling operation.

The thermo determination means 16 switches the operational state to thermo-ON if the set temperature is higher than the control temperature when thermo-OFF is set in heating operation.

The thermo determination means 16 switches the operational state to thermo-OFF if the set temperature is lower than the control temperature plus 1 degree C. when thermo-ON is set in heating operation.

(S58)

The indoor unit controller 12 stores the correction amount ΔT obtained when the operational state is switched from thermo-ON to thermo-OFF during cooling operation as ΔTcon, and proceeds to step S59.

The indoor unit controller 12 stores the correction amount ΔT obtained when the operational state is switched from thermo-OFF to thermo-ON during cooling operation as ΔTcoff, and proceeds to step S59.

The indoor unit controller 12 stores the correction amount ΔT obtained when the operational state is switched from thermo-ON to thermo-OFF during heating operation as ΔThon, and proceeds to step S59.

The indoor unit controller 12 stores the correction amount ΔT obtained when the operational state is switched from thermo-OFF to thermo-ON during heating operation as ΔThoff, and proceeds to step S59.

(S59)

The indoor unit controller 12 executes other normal control operations (not described in detail) as the indoor unit 1, and returns to step S52.

In this way, the correction amount ΔT calculated by the setting unit 3 is given to the indoor unit 1 and, further, the correction amount ΔT can be set more finely and stored for use when communication to receive the correction amount ΔT from the setting unit 3 stops abruptly. As a result, as opposed to conventional thermo determination, control can be performed which reduces the difference between the suction temperature and the space temperature and brings the set temperature closer to the space temperature.

Further, the indoor unit 1 can be controlled in the same manner for any type of external device from which the correction amount ΔT is received. Therefore, by inputting the correction amount ΔT to the indoor unit 1 from the outside of the air-conditioning apparatus, the indoor unit 1 can easily execute desired thermo determination.

As described above, in Embodiment 3, the thermo determination in the indoor unit 1 is finely adjusted based on each individual operation mode irrespective of whether the correction amount ΔT has been updated. Therefore, the difference between the set temperature and the temperature of the air-conditioned space can further be reduced.

The above description is directed to the case in which the setting unit 3 is provided separately from the indoor unit 1, and the suction temperature of the indoor unit 1 is corrected by using the correction amount ΔT given from the setting unit 3. This is to improve the versatility and extensibility of the indoor unit 1 by physically separating the configurations of the indoor unit 1 and setting unit 3.

That is, in terms of the control operation of the air-conditioning apparatus (indoor unit 1) alone, a configuration may be employed in which with respect to a set temperature that is acquired by a conventional indoor unit (existing indoor unit) from the outside, the setting unit 3 mentioned above is applied, and the result of calculation that subtracts the correction amount ΔT from the set temperature is given to the conventional indoor unit as a set temperature. Such a configuration can also provide the same effects as those of Embodiments 1 to 3 mentioned above.

Further, an alternative configuration may be adopted in which in the setting unit 3, thermo determination is executed directly on the basis of the set temperature and the space temperature, and the determination result is transmitted to the indoor unit 1 to execute the thermo-ON/OFF operation of the indoor unit 1. In this case, two approaches are conceivable: first, it is possible to add a thermo determination result as new communication information, and second, it is possible to transmit such a predetermined value that ensures a desired thermo determination result for the correction amount or set temperature mentioned above.

It is needless to mention that such an operation can also be implemented as appropriate by those skilled in the art by employing the technical ideas of Embodiments 1 to 3 mentioned above.

REFERENCE SIGNS LIST 1 indoor unit, 2 remote control unit, 3 setting unit, 4 transmission line, 5 personal computer, 6 transmission line, 11 transmission means, 12 indoor unit controller, 13 operation mode storing means, 14 suction temperature storing means, 15 suction temperature detection means, 16 thermo determination means, 17 set temperature storing means, 18 ΔT storing means, 19 suction temperature sensor, 21 transmission means, 22 remote control unit controller, 23 operation mode setting means, 24 operation mode display means, 25 set temperature setting means, 26 set temperature display means, 27 space temperature storing means, 28 space temperature display means, 31 transmission means, 32 setting unit controller, 33 space temperature processing means, 34 space temperature detection means, 35 transmission means, 36 ΔT calculation means, 37 suction temperature storing means, 38 space temperature sensor, 51 ΔT setting means, 52 space temperature setting means.

The invention claimed is:

1. An air-conditioning system comprising:
an air-conditioning apparatus that includes an indoor unit installed in an indoor space and is configured to air-condition an air-conditioned space in the indoor space; and
a setting unit configured to communicate with the air-conditioning apparatus,
the air-conditioning apparatus includes
a suction temperature sensor configured to detect a suction temperature of air drawn by suction into the indoor unit, and
a controller, the controller of the air-conditioning apparatus is configured to
control operation of the air-conditioning apparatus on a basis of a set temperature and the suction temperature detected by the suction temperature sensor, wherein the set temperature is set by an operational input,
determine a thermo determination value to indicate whether the air-conditioning apparatus is in a thermo-on state or a thermo-off state, wherein the thermo-on state is defined as the air-conditioning apparatus exerting its capacity and circulating air at a predetermined flow rate, and the thermo-off state means that the air-conditioning apparatus is not exerting its capacity or is not circulating air at the predetermined flow rate, and
transmit, to the setting unit, the thermo determination value and the suction temperature detected by the suction temperature sensor,
wherein the setting unit includes
a space temperature sensor that detects a space temperature of the air-conditioned space, and
a controller, the controller of the setting unit is configured to
acquire, from the space temperature sensor, the space temperature of the air-conditioned space,
receive, from the air-conditioning apparatus, the suction temperature detected by the suction temperature sensor at the air-conditioning apparatus and the thermo determination value, and
determine whether the air-conditioning apparatus is determined to be in the thermo-on state based on the thermo determination value,
when the air-conditioning apparatus is determined to be in the thermo-on state,
calculate a difference between the space temperature of the air-conditioned space acquired from the space temperature sensor of the setting unit and the suction temperature detected by the suction temperature sensor of the air-conditioning apparatus as a correction amount and
transmit, from the setting unit which detects the space temperature to the air-conditioning apparatus, information of the correction amount,
when the air-conditioning apparatus is not determined to be in the thermo-on state,
not transmit the information of the correction amount, and
the controller of the air-conditioning apparatus is further configured to
receive, from the controller of the setting unit, the correction amount which is calculated based on the space temperature acquired from the space temperature sensor of the setting unit and the suction temperature detected by the suction temperature sensor of the air-conditioning apparatus,
in response to receiving, from the setting unit, the correction amount which is calculated by the setting unit based on the space temperature acquired from the space temperature sensor of the setting unit and the suction temperature detected by the suction temperature sensor of the air-conditioning apparatus, obtain a control temperature by adding the correction amount, which is calculated by the setting unit based on the space temperature which is sensed by the setting unit and the suction temperature which is detected by the air-conditioning apparatus, received from the setting unit to the suction temperature detected by the suction temperature sensor, and then control the operation of the air-conditioning apparatus so that the control temperature becomes equal to the set temperature.

2. The air-conditioning system of claim 1, wherein the setting unit includes a space temperature sensor that is arranged in the air-conditioned space and configured to detect the space temperature of the air-conditioned space.

3. The air-conditioning system of claim 1, wherein the setting unit includes a space temperature setting unit into which information of the space temperature of the air-conditioned space is input.

4. The air-conditioning system of claim 1, wherein
the setting unit includes a correction amount setting unit into which information of the correction amount is input, and
the setting unit is configured to transmit the information of the correction amount input from the correction amount setting unit to the air-conditioning apparatus.

5. The air-conditioning system of claim 1, wherein
the setting unit includes
a space temperature sensor that is arranged in the air-conditioned space and configured to detect the space temperature of the air-conditioned space,
a space temperature setting unit into which information of the space temperature of the air-conditioned space is input, and
a correction amount setting unit into which information of the correction amount is input,
when information of the correction amount is input from the correction amount setting unit, the setting unit transmits the information of the correction amount to the air-conditioning apparatus,
when no information of the correction amount is input from the correction amount setting unit, and information of the space temperature of the air-conditioned space is input from the space temperature setting unit, the setting unit calculates a difference between the space temperature of the air-conditioned space and the suction temperature detected by the suction temperature sensor as a correction amount, and transmits information of the correction amount to the air-conditioning apparatus, and
when neither information of the correction amount to be input from the correction amount setting unit, nor information of the space temperature of the air-conditioned space to be input from the space temperature setting unit is obtained, the setting unit calculates a difference between the space temperature of the air-conditioned space detected by the space temperature sensor and the suction temperature detected by the suction temperature sensor as a correction amount, and transmits information of the correction amount to the air-conditioning apparatus.

6. The air-conditioning system of claim 2, wherein
the setting unit includes a plurality of space temperature sensors, and
the setting unit is configured to calculate an average of values detected by the plurality of space temperature sensors as the space temperature of the air-conditioned space.

7. The air-conditioning system of claim 2, wherein every time the space temperature of the air-conditioned space detected by the space temperature sensor is updated, the setting unit calculates a difference between the space temperature of the air-conditioned space and the suction temperature detected by the suction temperature sensor as a correction amount, and transmits information of the correction amount to the air-conditioning apparatus.

8. The air-conditioning system of claim 1, wherein
the setting unit is configured to periodically transmit information of the correction amount to the air-conditioning apparatus,
the air-conditioning apparatus includes a storing unit configured to store the information of the correction amount received from the setting unit,
the controller of the air-conditioning apparatus is further configured to
responsive to receiving the information of the correction amount from the setting unit, update the information of the correction amount stored in the storing unit to the received correction amount,
when no information of the correction amount is received from the setting unit, not update the information of the correction amount stored in the storing unit, and
the controller of the air-conditioning apparatus calculates the control temperature by adding the correction amount stored in the storing unit to the suction temperature detected by the suction temperature sensor.

9. The air-conditioning system of claim 1, comprising a remote control unit that is arranged in the air-conditioned space and configured to set the set temperature,
wherein the setting unit is arranged in the remote control unit.

10. The air-conditioning system of claim 9, wherein
the remote control unit includes a display, and
the remote control unit is configured to control the display of the remote control unit to display a temperature obtained by adding the correction amount to the suction temperature detected by the suction temperature sensor, as the temperature of the air-conditioned space in which the remote control unit is arranged.

11. The air-conditioning system of claim 1, wherein the setting unit is arranged in the indoor unit.

12. A control method for an air-conditioning system,
the air-conditioning system including
an air-conditioning apparatus that includes an indoor unit installed in an indoor space and is configured to air-condition an air-conditioned space in the indoor space, and
a setting unit configured to communicate with the air-conditioning apparatus,
the control method comprising:
a suction temperature detection step of detecting a suction temperature of air drawn by suction into the indoor unit;
a step of determining, at the air-conditioning apparatus, a thermo determination value to indicate whether the air-conditioning apparatus is in a thermo-on state or a thermo-off state, wherein the thermo-on state is defined as the air-conditioning apparatus exerting its capacity and circulating air at a predetermined flow rate, and the thermo-off state means that the air-conditioning apparatus is not exerting its capacity or is not circulating air at the predetermined flow rate,
a step of transmitting, from the air-conditioning apparatus, to the setting unit, the thermo determination value and the suction temperature which is detected;
a step of acquiring a space temperature of the air-conditioned space using the setting unit;
a step of receiving, at the setting unit, from the air-conditioning apparatus, the suction temperature of air drawn by suction into the indoor unit and the thermo determination value;
a transmitting step of, using the setting unit:
determining, whether the air-conditioning apparatus is determined to be in the thermo-on state based on the thermo determination value;
when the air-conditioning apparatus is determined to be in the thermo-on state,
calculating a difference between the space temperature of the air-conditioned space and the suction temperature detected in the suction temperature detection step as a correction amount, and transmitting, from the setting unit to the air-conditioning apparatus, information of the correction amount;

when the air-conditioning apparatus is not determined to be in the thermo-on state, not transmitting the information of the correction amount, a receiving step of, using the air-conditioning apparatus, receiving, from the setting unit, the information of the correction amount which is calculated based on the space temperature acquired from the setting unit and the suction temperature detected in the suction temperature detection step; and a control step of controlling operation of the air-conditioning apparatus so that a control temperature obtained by adding the received correction amount, which is calculated based on the space temperature acquired from the setting unit and the suction temperature which is detected in the suction temperature detection step, to the suction temperature detected in the suction temperature detection step becomes equal to a set temperature.

13. The control method for an air-conditioning system of claim 12, comprising:

after the receiving step, a storing step of storing the information of the correction amount received from the setting unit, wherein the transmitting step includes periodically transmitting information of the correction amount to the air-conditioning apparatus, and the control step includes calculating the control temperature by adding the correction amount stored in the storing step to the suction temperature detected in the suction temperature detection step, if no information of the correction amount is received from the setting unit for a predetermined period of time.

14. An air-conditioning system comprising:

an air-conditioning apparatus that includes an indoor unit installed in an indoor space and is configured to air-condition an air-conditioned space in the indoor space; and a setting unit configured to communicate with the air-conditioning apparatus, the air-conditioning apparatus includes a suction temperature sensor configured to detect a suction temperature of air drawn by suction into the indoor unit, and a controller, the controller of the air-conditioning apparatus is configured to control operation of the air-conditioning apparatus on a basis of a set temperature and the suction temperature detected by the suction temperature sensor, determine a thermo determination value to indicate whether the air-conditioning apparatus is in a thermo-on state or a thermo-off state, wherein the thermo-on state is defined as the air-conditioning apparatus exerting its capacity and circulating air at a predetermined flow rate, and the thermo-off state means that the air-conditioning apparatus is not exerting its capacity or is not circulating air at the predetermined flow rate, and transmit, to the setting unit, the thermo determination value and the suction temperature detected by the suction temperature sensor, wherein the setting unit is configured to acquire a space temperature of the air-conditioned space, receive, from the air-conditioning apparatus, the suction temperature detected by the suction temperature sensor at the air-conditioning apparatus and the thermo determination value, and determine whether the air-conditioning apparatus is determined to be in the thermo-on state based on the thermo determination value, when the air-conditioning apparatus is determined to be in the thermo-on state, calculate a difference between the space temperature of the air-conditioned space acquired from the space temperature sensor of the setting unit and the suction temperature detected by the suction temperature sensor of the air-conditioning apparatus as a correction amount and transmit, from the setting unit which detects the space temperature to the air-conditioning apparatus, information of the correction amount, when the air-conditioning apparatus is not determined to be in the thermo-on state, not transmit the information of the correction amount, and the controller of the air-conditioning apparatus is further configured to obtain a control temperature by adding the correction amount, which is calculated based on the space temperature which is sensed by the setting unit and the suction temperature which is detected by the air-conditioning apparatus, the correction amount being received from the setting unit, to the suction temperature detected by the suction temperature, determine, as a thermo determination, which of a thermo-on setting and a thermo-off setting to use based on (i) an operational state of the air-conditioning apparatus and (ii) a comparison of the control temperature to the setting temperature, control the operation of the air-conditioning apparatus to switch to the thermo determination which was determined so that the control temperature becomes equal to the set temperature.

* * * * *